US008065246B2

(12) United States Patent
Bouchard

(10) Patent No.: US 8,065,246 B2
(45) Date of Patent: Nov. 22, 2011

(54) CLUSTERING AND CLASSIFICATION EMPLOYING SOFTMAX FUNCTION INCLUDING EFFICIENT BOUNDS

(75) Inventor: Guillaume Bouchard, Crolles (FR)

(73) Assignee: Xerox Corporation, Norwalk, CT (US)

( * ) Notice: Subject to any disclaimer, the term of this patent is extended or adjusted under 35 U.S.C. 154(b) by 651 days.

(21) Appl. No.: 12/250,714

(22) Filed: Oct. 14, 2008

(65) Prior Publication Data

US 2010/0094787 A1    Apr. 15, 2010

(51) Int. Cl.
*G06F 15/18* (2006.01)
*G06F 1/02* (2006.01)
*G06N 3/02* (2006.01)
*G06N 5/02* (2006.01)

(52) U.S. Cl. ............................ 706/19; 706/46; 708/277
(58) Field of Classification Search .................. 706/19
See application file for complete search history.

(56) References Cited

U.S. PATENT DOCUMENTS

| 7,567,946 | B2 * | 7/2009 | Andreoli et al. ............... 706/46 |
| 7,865,089 | B2 * | 1/2011 | Andreoli et al. ................. 399/8 |
| 7,889,842 | B2 * | 2/2011 | Gautier et al. ................. 378/84 |
| 7,929,165 | B2 * | 4/2011 | Bressan et al. ............... 358/1.15 |

OTHER PUBLICATIONS

Direct torque control theory of a double three-phrase permanent magnet synchronous motor, Yi Guo; Wei Feng Shi; Chen, C.L.P.; Systems, Man and Cybernetics, 2009. SMC 2009. IEEE International Conference on Digital Object Identifier: 10.1109/ICSMC.2009. 5346078 Publication Year: 2009 , pp. 4780-4785.*
"Back-Seat Driver": Spatial Sound for Vehicular Way-Finding and Situation Awareness, Michael Cohen; Owen Noel Newton Fernando; Tatsuya Nagai; Kensuke Shimizu; Frontier of Computer Science and Technology, 2006. FCST '06. Japan-China Joint Workshop on Digital Object Identifier: 10.1109/FCST.2006.1 Publication Year: 2006 , pp. 109-115.*
Chipman et al., "Discussion of the paper Bayesian Treed Generalized Linear Models," Proceedings Seventh Valencia International Meeting on Bayesian Statistics, vol. 7, pp. 98-101, 2002.
Blei et al., "A Correlated Topic Model of Science," Annals of Applied Statistics, 1:17-35, 2007.
Bohning, "The lower bound method in probit regression," Elsevier Science B.V., Computational Statistics & Data Analysis 30, pp. 13-17, 1999.
Gibbs, "Bayesian Gaussian Processes for Regression and Classification," Ph.D. Thesis, University of Cambridge, 1997.

(Continued)

*Primary Examiner* — Michael B Holmes
(74) *Attorney, Agent, or Firm* — Fay Sharpe LLP

(57) ABSTRACT

A function optimization method includes the operations of: constructing an upper bound using a double majorization bounding process to a sum-of-exponentials function including a summation of exponentials of the form $$\sum_{k=1}^{K} e^{\beta_k^T x};$$

optimizing the constructed upper bound respective to parameters β to generate optimized parameters β; and outputting the optimized sum-of-exponentials function represented at least by the optimized parameters β. An inference process includes the operations of: invoking the function optimization method respective to a softmax function constrained by discrete observations y defining categorization observation conditioned by continuous variables x representing at least one input object; and applying the optimized softmax function output by the invocation of the softmax function optimization method to the continuous variables x representing at least one input object to generate classification probabilities.

21 Claims, 3 Drawing Sheets

OTHER PUBLICATIONS

Girolami et al., "Variational Bayesian Multinomial Probit Regression with Gaussian Process Priors," Neural Comput., 18(8):1790-1817, 2006.

Jaakkola et al., "A variational approach to Bayesian logistic regression models and their extensions," In Proceedings of the Sixth International Workshop on Artificial Intelligence and Statistics., 1996.

Jebara et al., "On Reversing Jensen's Inequality," In Advances in Neural Information Processing Systems 13, pp. 231-237, 2000.

Krishnapuram et al., "Sparse Multinomial Logistic Regression: Fast Algorithms and Generalization Bounds," IEEE Trans Pattern Anal Mach Intell, 27(6):957-68, 2005.

Lawrence et al., "Reducing the Variability in cDNA Microarray Image Processing by Bayesian Inference," University of Sheffield School of Medicine and Biomedical Science, UK, pp. 1-10, (2003).

Murphy, "Inference and Learning in Hybrid Bayesian Networks," Technical Report UCB/CSD-98-990, EECS Department, University of California, 1998.

Bishop et al., "VIBES: A variational Inference Engine for Bayesian Networks," Oral presentation with live demo.

Bouchard, "Efficient Bounds for the Softmax Function and Applications to Approximate Inference in Hybrid Models," (2008).

* cited by examiner

| METHOD | LOG | LOCAL QUADRATIC | DOUBLE MAJ. |
|---|---|---|---|
| d=2,K=2 | 1.69852( 7) | 4.2913(2e+01) | 4.17173(3e+01) |
| d=2,K=10 | 0.0909539(0.1) | 4.00055( 3) | 0.544315(0.1) |
| d=10,K=10 | 0.523273(0.2) | 13.9242( 4) | 0.742303(0.2) |
| d=10,K=100 | 0.189525(0.1) | 84.4871(2e+01) | 2.25458(0.2) |
| d=10,K=1000 | 0.208771(0.1) | 88.7137(2e+01) | 2.28424(0.2) |
| d=100,K=1000 | 0.220016(0.1) | 91.2663(2e+01) | 2.30886(0.2) |
| d=2,K=2,var=10 | 11.097( 7) | 21.6069(1e+01) | 2.89464( 2) |
| d=2,K=10,var=10 | 4.12899( 2) | 73.147(3e+01) | 1.94252(0.5) |
| d=10,K=10,var=10 | 11.9611( 3) | 185.402(4e+01) | 2.80779(0.2) |
| d=10,K=10,var=10,samecov | 10.0631( 3) | 196.382(5e+01) | 2.98899(0.2) |
| d=10,K=10,var=10,samecov,high disc | 28689.3(8e+04) | 516423(1e+06) | 3.57032(0.4) |
| d=10,K=10,var=10,samecov,high corr | 623176(4e+06) | 1.12172e+07(8e+07) | 3.594(0.1) |

*FIG. 1*

| BOUND | A | B | C |
|---|---|---|---|
| B1 | $I_d - \frac{1}{K}\mathbf{1}\mathbf{1}^T$ | $\left(\frac{e^{\lambda_k}}{\sum_{k'=1}^{K}e^{\lambda_{k'}}} + 2\frac{\lambda^T \mathbf{1}}{K} - \lambda_k\right)_{k=1}^{K}$ | $\log\sum_{k=1}^{K}e^{\lambda_k} - \frac{(\lambda^T \mathbf{1})^2}{K} + \sum_{k=1}^{K}\lambda_k^2 - \frac{\sum_{k'=1}^{K}e^{\lambda_{k'}}}{\sum_{k'=1}^{K}e^{\lambda_{k'}}}$ |
| B2 | $\mathrm{diag}(\lambda(\xi_k)_{k=1}^{K})$ | $\frac{1}{2} - 2(\alpha\lambda(\xi_k))_{k=1}^{K}$ | $\alpha - \sum_{k=1}^{K}\frac{\xi_k + \alpha}{2}$ $+\lambda(\xi_k)(\alpha^2 - \xi_k^2) + \log(1 + e^{\xi_k})$ |

SUMMARY OF QUADRATIC UPPER BOUNDS: $\log\sum_{k=1}^{K}e^{x_k} \leq x^T A x + x^T b + c$

FIG. 3

CLUSTERING AND CLASSIFICATION EMPLOYING SOFTMAX FUNCTION INCLUDING EFFICIENT BOUNDS

BACKGROUND

The following relates to the information processing arts and related arts.

The softmax function is the extension of the sigmoid function for more than two variables. The softmax function has the form:

$$y_n = \frac{e^{x_n}}{\sum_{k=1}^{K} e^{x_k}}. \quad (1)$$

The denominator is a sum-of-exponentials function of the form:

$$\sum_{k=1}^{K} e^{x_k}, \quad (2)$$

where $x_k \in x \in \mathfrak{R}^K$. The softmax function finds application in neural networks, classifiers, and so forth, while the sum-of-exponentials function finds even more diverse application in these fields as well as in statistical thermodynamics (for example, the partition function), quantum mechanics, information science, classification, and so forth. For some applications a log of the sum-of-exponentials function is a more useful formulation.

One application of the softmax function is in the area of inference problems, such as Gaussian process classifiers, Bayesian multiclass logistic regression, and more generally for deterministic approximation of probabilistic models dealing with discrete variables conditioned on continuous variables. Such applications entail computing the expectation of the log-sum-of-exponentials function:

$$\gamma = E_Q\left[\log \sum_{k=1}^{K} e^{\beta_k^T x}\right], \quad (3)$$

where $E_Q$ denotes the expectation for a distribution $Q(\beta)$ which is the probability density function (pdf) of a given multidimensional distribution in $\mathfrak{R}^{d \times K}$ and x is a vector of $\mathfrak{R}^d$. The expectation can be computed using Monte Carlo simulations, but this can be computationally expensive. Taylor expansion techniques are also known, but tend to provide skewed results when the variance of the pdf $Q(\beta)$ is large.

Another known approach for computing the expectation is to use an upper bound. In this approach an upper bound on the log-sum-of-exponentials function is identified, from which an estimate of the expectation is obtained. The chosen upper bound should be tight respective to the log-sum-of-exponentials function, and should be computationally advantageous for computing the expectation. For the log-sum-of-exponentials function, a known upper bound having a quadratic form is given by:

$$\log \sum_{k=1}^{K} e^{x_k} \le \sum_{k=1}^{K} (x_k - \chi_k)^2 - \quad (4)$$

$$\frac{1}{K}\left(\sum_{k=1}^{K}(x_k - \chi_k)\right) + \sum_{k=1}^{K}\frac{(x_k - \chi_k)e^{\chi_k}}{\sum_{k'=1}^{K} e^{\chi_{k'}}} + \log\sum_{k=1}^{K} e^{\chi_k},$$

See, e.g., Krishnapuram et al., Sparse multinomial logistic regression: fast algorithms and generalization bounds. IEEE Trans. Pattern Anal. Mach. Intell., 27(6):957-68, 2005; Böhning, Multinomial logistic regression algorithm. Annals of the Institute of Statistical Mathematics, 44(9):197-200, 1992. These quadratic bounds are generally tight. However, they use the worst curvature over the space, which can result in inefficient integrating when using the upper bound.

As a result, the use of the softmax function for inference problems with more than two variables has heretofore been computationally difficult or impossible for many practical inference and classification problems.

BRIEF DESCRIPTION

In some embodiments disclosed as illustrative examples, a storage medium stores instructions executable to implement a sum-of-exponentials function optimization method including the operations of: constructing an upper bound using a double majorization bounding process to a sum-of-exponentials function including at least one summation of exponentials; optimizing the constructed upper bound respective to parameters of the exponentials of the at least one summation of exponentials to generate optimized parameters; and outputting the optimized sum-of-exponentials function represented at least by the optimized parameters.

In some embodiments disclosed as illustrative examples, an inference engine is disclosed comprising a processor programmed to perform an inference process comprising: generating an upper bound by double majorization for a sum-of-exponentials function including at least one summation of exponentials of the form $$\sum_{k=1}^{K} e^{\beta_k^T x}$$

constrained by an input object representation vector and an output classification observation vector; optimizing the upper bound respective to parameters $\beta_k$ of the sum-of-exponentials function; and classifying one or more input objects by applying the sum-of-exponentials function with the optimized parameters $\beta_k$ to said one or more input objects.

In some embodiments disclosed as illustrative examples, a storage medium stores instructions defining a function for optimizing a sum-of-exponentials function including a summation of exponentials of the form $$\sum_{k=1}^{K} e^{\beta_k^T x}$$

by optimization operations comprising: upper bounding the sum of exponentials $$\sum_{k=1}^{K} e^{\beta_k^T x}$$

by a product of sigmoids; upper bounding terms of the form $\log(1+e^x)$ in the product of sigmoids to generate a double majorization upper bound; minimizing the double majorization upper bound respective to the parameters $\beta$ to generate optimized parameters $\beta$; and outputting the optimized sum-of-exponentials function represented at least by the optimized parameters $\beta$.

BRIEF DESCRIPTION OF THE DRAWINGS

FIG. 1 illustrates a tables of results discussed in the text.

FIG. 3 illustrates a table of quadratic upper bounds discussed in the text.

DETAILED DESCRIPTION

Figure 2:
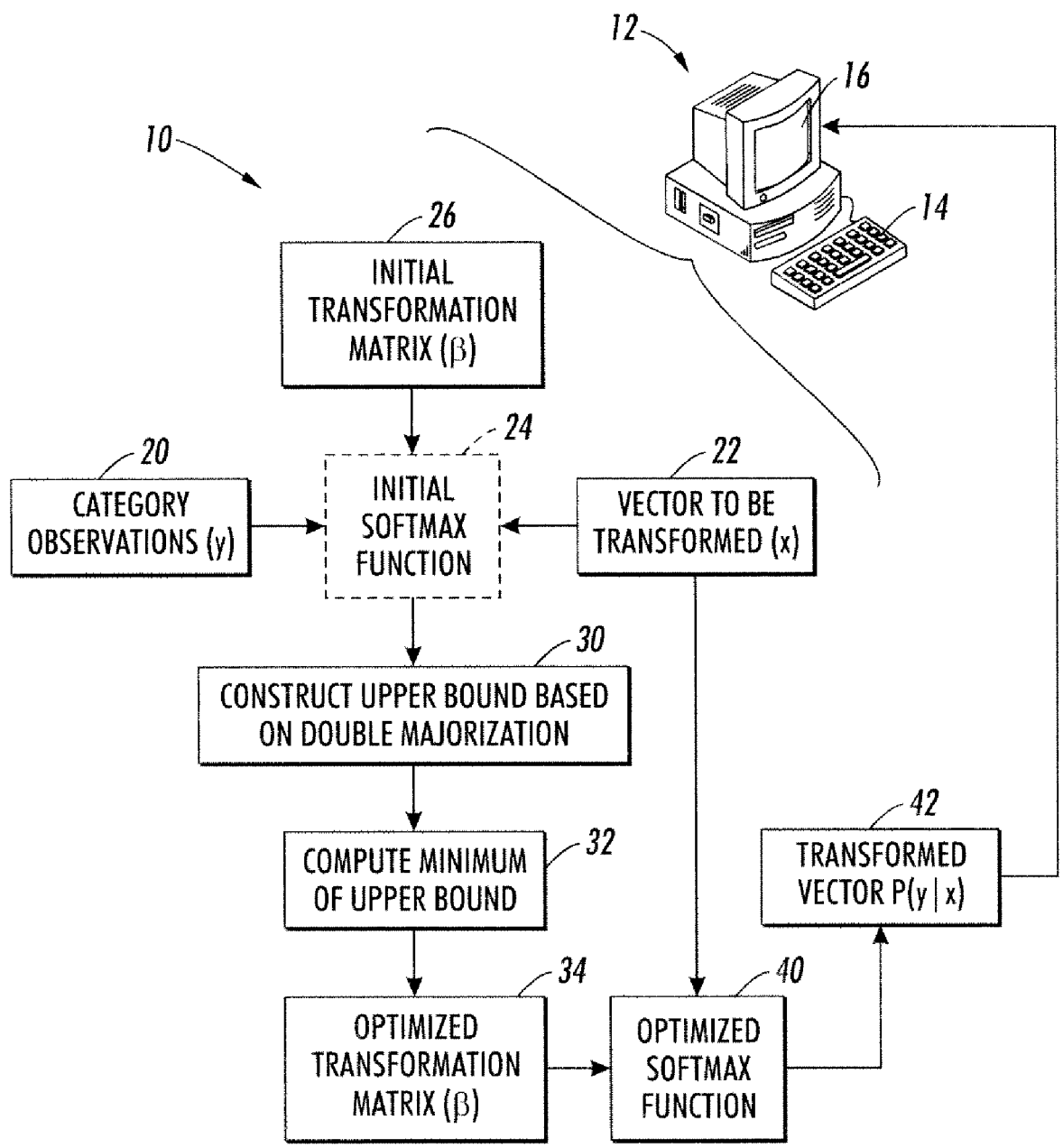
FIG. 2 diagrammatically shows a Bayesian inference engine.

The log-sum-of-exponentials function has concavity and a suitable upper bound is given by:

$$\log \sum_{k=1}^{K} e^{x_k} \leq \phi \sum_{k=1}^{K} e^{x_k} - \log \phi - 1, \quad (5)$$

where the equality holds if and only if:

$$\phi = \left( \sum_{k=1}^{K} e^{x_k} \right)^{-1}. \quad (6)$$

Advantageously, the expectation of the right hand side can be readily computed for certain useful distributions since $E_Q e^{x_k}$ is the moment-generating function of the distribution Q. To obtain a better local quadratic approximation, a bound for the log-sum of exponentials is generated by a double majorization process comprising: (i) a first majorization operation in which the sum of the exponential is upper bounded by a product of sigmoids; and (ii) a second majorization operation using a standard quadratic bound on $\log(1+e^x)$ to obtain the final upper bound.

For any $x \in \mathfrak{R}^K$ and for any $\alpha \in \mathfrak{R}$, a product of sigmoids and corresponding bound can be written as follows:

$$\prod_{k=1}^{K} (1 + e^{x_k - \alpha}) \leq \sum_{k=1}^{K} e^{x_k - \alpha} = e^{-\alpha} \sum_{k=1}^{K} e^{x_k}, \quad (7)$$

from which can be obtained:

$$\log \sum_{k=1}^{K} e^{x_k} \leq \alpha + \sum_{k=1}^{K} \log(1 + e^{x_k - \alpha}), \quad (8)$$

A property for this bound is that its asymptotes are parallel in most directions. More exactly, by applying the bound to ax where $a \to \infty$, the difference between the right and the left part of equation tends to a constant if there exists at least one $x_k$ positive and $x_k \neq x_{k'}$ for all $k \neq k'$. The standard quadratic bound for $\log(1+e^x)$ is given by:

$$\log(1 + e^x) \leq \lambda(\xi)(x^2 - \xi^2) + \frac{x - \xi}{2} + \log(1 + e^\xi), \quad (9)$$

for all $\xi \in \mathfrak{R}$. It is applied inside the sum of Equation (8). For any $x \in \mathfrak{R}^K$ and any $\alpha \in \mathfrak{R}^K$, and for any $\xi \in [0,\infty)^K$ to yield:

$$\log \sum_{k=1}^{K} e^{x_k} \leq \alpha + \sum_{k=1}^{K} \frac{x_k - \alpha - \xi_k}{2} + \quad (10)$$
$$\lambda(\xi_k)((x_k - \alpha)^2 - \xi_k^2) + \log(1 + e^{\xi_k}),$$

where:

$$\lambda(\xi_k) = \frac{1}{2\xi} \left[ \frac{1}{1 + e^{-\xi}} - \frac{1}{2} \right]. \quad (11)$$

Equations (10) and (11) set forth an upper bound on the log-sum-of-exponentials.

Attention is turned to the illustrative application of estimating the expectation $\gamma$ of the log-sum-of-exponentials set forth in Equation (3). A variational technique based on the maximization of a lower bound of $\gamma$ can be used. In the following, the pdf $Q(\beta_k)$ is considered to be a multivariate normal distribution with mean $\mu_k$ and variance $\Sigma_k$. This illustrative example is readily extended to other multivariate distributions with bounded variances. Using the moment generating function $$E_Q \left[ e^{\beta_k^T x} \right] = e^{\mu_k^T x + \frac{1}{2} x^T \Sigma_k x} \quad (12)$$

of the multivariate normal distribution, the following bound on the expectation $\gamma$ is obtained:

$$\gamma = E_Q \left[ \log \sum_{k=1}^{K} e^{\beta_k^T x} \right] \leq \phi \sum_{k=1}^{K} e^{\mu_k^T x + \frac{1}{2} x^T \Sigma_k x} - \log(\phi) - 1, \quad (13)$$

for every $\phi \in \mathfrak{R}^K$. Minimizing the right hand side with respect to $\phi$ leads to the upper bound:

$$\gamma = E_Q \left[ \log \sum_{k=1}^{K} e^{\beta_k^T x} \right] \leq \log \sum_{k=1}^{K} e^{\mu_k^T x + \frac{1}{2} x^T \Sigma_k x} \quad (14)$$

which shows that the bound becomes accurate when the variance of Q is small. The expectation over quadratic bounds gives:

$$\gamma \leq (K-1)x^T \Sigma x + \sum_{k=1}^{K} (\mu_k^T x - \chi_k)^2 - \qquad (15)$$

$$K(\overline{\mu}^T x - \overline{\chi})^2 + \sum_{k=1}^{K} \frac{(\mu_k^T x - \chi_k)e^{\chi_k}}{\sum_{k'=1}^{K} e^{\chi_{k'}}} + \log \sum_{k=1}^{K} e^{\chi_k},$$

where $$\Sigma = \frac{1}{K} \sum_{k} \Sigma_k. \qquad (16)$$

A minimization of the right hand side with respect to $\chi$ gives the solution $\chi_k = \mu_k^T x$. At this point, the difference between the expectation $\gamma$ and its upper bound is at least $(K-1)x^T \Sigma x$. This means that the bound is tight if the distribution lies in a manifold orthogonal to x.

Returning to Equation (10), the following holds:

$$\gamma \leq \sum_{k=1}^{K} \lambda(\xi_k)(x^T \Sigma_k x + (\mu_k^T x)^2) + \left(\frac{1}{2} - 2\alpha\lambda(\xi_k)\right)\mu_k^T x + \qquad (17)$$

$$\alpha - \sum_{k=1}^{K} \frac{\xi_k + \alpha}{2} + \lambda(\xi_k)(\alpha^2 - \xi_k^2) + \log(1 + e^{\xi_k}),$$

The minimization of the upper bound with respect to $\xi$ gives:

$$\xi_k^2 = x^T \Sigma_k x + (\mu_k^T x)^2 + \alpha^2 - 2\alpha\mu_k^T x \qquad (18),$$

for $k=1, \ldots, K$. The minimization with respect to $\alpha$ gives:

$$\alpha = \frac{\sum_{k=1}^{K} \lambda(\xi_k)\mu_k^T x + \frac{1}{2}\left(\frac{K}{2} - 1\right)}{\sum_{k=1}^{K} \lambda(\xi_k)}. \qquad (19)$$

Several experiments were performed to compare the approximations based on the log, on the quadratic upper bound for the softmax (see Equation (4)), and the upper bound based on a double majorization as disclosed herein. The table shown in FIG. 1 summarizes the results. For every experiment, a vector $x \in \mathfrak{R}^d$ was randomly sampled, a mean $\mu_k$ according to a standardized normal distribution, and a covariance matrix using a Wishart distribution with identity scale matrix and $10 \, I_d$ for experiments labeled with var=10. The dimension d of the x vector varied from 2 to 100, the number of classes ranged from K=2 (corresponding to the classical binary case) to K=1000. The Wishart distribution had 100 degrees of freedom and (d+1 in the highly correlated (high corr) case). In the high discrepancy (high disc) case, the vector x has many extreme values: it was generated using a student t distribution with 10 degrees of freedom. In experiments labelled samecov, the covariance of every $Q(\beta_k)$ was the same. A hundred independent replications of the same experience were replicated. Every bound was compared to a Monte-Carlo sample of size 100,000 (its variance was negligible compared to the error of the bound).

With continuing reference to the table shown in FIG. 1, the variance of Q is seen to directly influence the choice of the bounding methods. For small variances, the linear approximation of the log seems to give the best results. For large variances, the bound disclosed herein is substantially more accurate than the other methods. Without being limited to any particular theory of operation, this is believed to be mainly due to the fact that the approximation disclosed herein is asymptotically optimal, so that it is robust to cases where the distribution is not precisely localized. For truly Bayesian models, having a model that is accurate in the high variance cases is advantageous since it enable a correct (that is, not too biased) estimation of the uncertainty. It is noteworthy that the quality of the approximations do not degrades too much when dealing with a large number of classes or high dimensional data. Another item evidenced in the experiments summarized in FIG. 1 is that the quadratic upper bound of the Hessian (which is often used find the MAP solutions of multiclass logistic regression) gives poor results in most of the cases.

With reference to FIG. 2, a Bayesian inference engine 10 employing the illustrative upper bound based on a double majorization is described. The inference engine 10 is suitably embodied by a computer 12 or other digital processing device including a digital processor such as a microprocessor, microcontroller, or so forth and storage. In other embodiments, the inference engine may be embodied by a server including a digital processor and including or having access to digital data storage, such server being suitably accessed via the Internet or a local area network, or by a personal data assistant (PDA) including a digital processor and digital data storage, or so forth. The computer 12 or other digital processing device suitably includes or is operatively connected with one or more user input devices such as an illustrated keyboard 14 for receiving user input to control the inference processing, and further includes or is operatively connected with one or more display devices such as an illustrated display 16 for displaying output generated based on the output of the inference engine. In other embodiments, the input for controlling the inference process is received from another program running previously to or concurrently with the inference engine on the computer 12, or from a network connection, or so forth. Similarly, in other embodiments the output may serve as input to another program running subsequent to or concurrently with the inference engine on the computer 12, or may be transmitted via a network connection, or so forth.

In some embodiments, the disclosed softmax optimization processes, inference engines employing same, and so forth are embodied by a storage medium storing instructions executable (for example, by a digital processor) to implement a softmax function optimization method, inference engine, or so forth. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

The illustrative Bayesian inference engine 10 employs multinomial logistic regression. A multinomial logistic model is considered, with discrete observations $y=(y_1, \ldots, y_n) \square \{1, \ldots, K\}^n$ 20 conditioned by continuous variables $x=(x_1, \ldots, x_n) \in \mathfrak{R}^{n \times d}$ 22, such as a vector to be transformed, via a softmax function of the form:

$$P(y = k | x; \beta) = \frac{e^{\beta_k^T x}}{\sum_{k'=1}^{K} e^{\beta_{k'}^T x}}. \qquad (20)$$

An initial (that is, not yet optimized) softmax function 24 has the form of Equation (20) with an initial (that is, not yet optimized) transformation matrix β 26. The objective is to optimize the transformation matrix β of the softmax function respective to the constraints 20, 22. As an example of one practical application of the Bayesian inference engine 10, the discrete observations y 20 may be category observations for a text-based document classifier, and the continuous variables x 22 may represent bag-of-words" representations of documents to be classified. In another practical application, the discrete observations y 20 may be category observations for an image classifier, and the continuous variables x 22 may represent features vector representations of images to be classified. These are merely illustrative practical applications, and numerous other applications entailing optimization of parameters 26 of the softmax function 24 constrained by observations 20 conditioned by continuous variables 22 are contemplated.

The Bayesian inference determines values for the transformation matrix elements of the parameters matrix β 26 that optimally satisfy the softmax function 24 under the constraints 20, 22. In other words, it is desired to maximize the posterior distribution P(β|x,y). For any choice of the prior there do not exist a closed form solution for the posterior distribution P(β|x,y). Variational approximations are based on the minimization of KL(Q(β)∥P(β|y,x)) over a class of distributions $F_Q$ for which the computation is effective.

With continuing reference to FIG. 2, the problem is solved indirectly by constructing 30 an upper bound based on double majorization and computing 32 a minimum of the upper bound respective to the transformation matrix β in order to obtain an optimized transformation matrix β 34. the problem is equivalent to maximizing the following lower bound L on P(y,x):

$$\log P(y, x) \geq E_Q[\log P(y, x, \beta)] - KL(Q(\beta)\|P(\beta)) := L(\mu, \Sigma) \quad (21)$$

$$= \sum_{k=1}^{K} \sum_{i,y_i=k} E_Q[\beta_k^T x_i] - \sum_{i=1}^{n} E_Q\left[\log \sum_{k'=1}^{K} e^{\beta_{k'}^T x_i}\right] -$$

$$KL(Q(\beta)\|P(\beta)).$$

Using a quadratic bound for the second expectation, a lower bound $F(\mu,\Sigma,\xi)$ of $L(\mu,\Sigma)$ is obtained:

$$F(\mu, \Sigma, \xi) = \quad (22)$$

$$-\frac{1}{2}\sum_{k=1}^{K} tr(A_k E_Q[\beta_k \beta_k^T]) + \sum_{k=1}^{K} b_k^T E_Q[\beta_k] - KL(Q(\beta)\|P(\beta)) - c,$$

where $A_k$, $b_k$, and c depend on the choice of the quadratic bound. Equation (22) represents the upper bound output by the construction operation 30.

It will be appreciated that it is possible to construct 30 the upper bound as set forth in Equation (22) without actually generating the initial softmax function 24. To illustrate this option, in FIG. 2 the initial softmax function 24 is illustrated using dotted lines to represent that it may optionally be a conceptual element that is not actually generated.

With continuing reference to FIG. 2 and with brief reference to FIG. 3, the terms $A_k$, $b_k$, and c are given for the quadratic bound (B1) of Equation (4) and for the upper bound (B2) based on a double majorization of Equation (10). For the bound based on double majorization, the terms are:

$$A_k = 2\sum_i \lambda(\xi_{ik}) x_i x_i^T, \quad (23)$$

$$b_k = \sum_i \left(y_{ik} - \frac{1}{2} + 2\alpha_i \lambda(\xi_{ik})\right) x_i, \quad (24)$$

and $$c = 2\sum_{i,k} \alpha_i \left(\frac{K}{2} - 1\right) + \frac{\xi_{ik}}{2} - \lambda(\xi_{ik})(\alpha_i^2 - \xi_{ik}^2) - \log(1 + e^{\xi_{ik}}), \quad (25)$$

With continuing reference to FIG. 2, the upper bound output by the construction operation 30 is minimized in computation operation 32 to generate the optimized transformation matrix 34. Assuming independent Gaussian priors P=N($\overline{\mu}_k$, $\overline{\Sigma}_k$) for the parameters $\beta_k$, k=1, . . . , K, the KL-divergence between Gaussians is given by:

$$KL(Q(\beta)\|P(\beta)) = \quad (26)$$

$$-\frac{1}{2}\sum_{k=1}^{K}\left(\log\frac{|\Sigma_k|}{|\overline{\Sigma}_k|} + tr(\Sigma_k \overline{\Sigma}_k^{-1}) + (\mu_k - \overline{\mu}_k)^T \overline{\Sigma}_k^{-1}(\mu_k - \overline{\mu}_k) - Kd\right),$$

so that a closed-form solution is obtained of the maximum of $F(\mu,\Sigma,\xi)$ with respect to μ and Σ:

$$\hat{\Sigma}_k = (A_k + \overline{\Sigma}_k^{-1})^{-1} \quad (27),$$

and $$\hat{\mu}_k = \hat{\Sigma}_k (b + \overline{\Sigma}_k^{-1} \overline{\mu}_k) \quad (28).$$

This gives the updates:

$$\hat{\Sigma}_k^{-1} = \overline{\Sigma}_k^{-1} + \sum_i 2\lambda(\xi_{ik}) x_i x_i^T, \quad (29)$$

and $$\hat{\mu}_k = \hat{\Sigma}_k \left[\overline{\Sigma}_k^{-1} \overline{\mu}_k + \sum_i \left(y_{ik} - \frac{1}{2} + 2\alpha_i \lambda(\xi_{ik})\right) x_i\right]. \quad (30)$$

The optimized parameters $\beta_k$, k=1, . . . , K 34 are directly computed from the optimized independent Gaussian priors P=N($\overline{\mu}_k$,$\overline{\Sigma}_k$). These optimized parameters 34 are then used to generate an optimized softmax function 40, for example by inserting the optimized transformation matrix β 34 into the softmax function of Equation (20). A transformed vector P(y|x) 42 is readily generated by evaluating the optimized softmax function 40 for the input vector 22 to be transformed. For the illustrative practical application in which the continuous variables x 22 represent bag-of-words" representations of documents to be classified, the output transformed vector P(y|x) 42 represents the probabilities of the categories 24 for various documents represented as bags-of-words. In other words, the transformed vector P(y|x) 42 provides the soft classification probabilities for the input documents. In the illustrative practical application in which the continuous variables x 22 represent features vector representations of images, the output transformed vector P(y|x) 42 represents the probabilities of the categories 24 for various images represented by feature vectors. In other words, the transformed vector P(y|x) 42 provides the soft classification probabilities for the images to be classified. Again, these are merely non-limiting illustrative practical applications. The resulting output transformed vector P(y|x) 42 may be used in various ways, such as displaying the classification on the display 16. For example, a "hard" classification may be obtained and displayed by assigning each text document or image the class having the highest probability in P(y|x). Alternatively, a plot of classification probabilities may be generated and displayed suitably coded by color or other distinguishing aspect. In other embodiments, the output transformed vector P(y|x) 42 is not directly displayed, but rather may be used to assign a hard or soft classification to the continuous variables 22 (text documents or images, in the illustrative practical examples) for use in indexing the documents or images in a database or other storage arrangement.

In some applications, it may be desirable to operate on the moment generating function $E_Q[e^{\beta_k^T x}]$, rather than on the log-sum-of-exponentials. In the case of the bound constructed 30 based on the moment generating function of Equation (12), the result is:

$$F(\mu, \Sigma, \phi) = -\sum_{k=1}^{K} \mu_k^T s_k + \sum_{i=1}^{n} \phi_i \sum_{k=1}^{K} e^{\mu_k^T x_i + \frac{1}{2} x_i^T \Sigma_k x_i} - \log(\phi_i) - n - KL(Q(\beta) \| P(\beta)), \quad (31)$$

where:

$$s_k = \sum_{i, y_i = k} x_i. \quad (32)$$

The minimization 32 with respect to $\phi$ is straightforward. For a fixed $\phi$, the objective can be decomposed into a sum of independent functions of $(\mu_k, \Sigma_k)$ that can be maximized independently for k=1, ..., K. Since the gradient can be computed easily and F is concave with respect to $\mu$ and $\Sigma$, the minimization and can be done using a standard optimization package. In one suitable approach the reparameterizations $\phi = a^2$ and $\Sigma = R^{0.5} (R^{0.5})^T$ are used to transform to an unconstrained maximization problem. Alternatively, it is possible to find $\mu_k$ and $\Sigma_k$ using a fixed point equation. In the case of quadratic bounds, the maximization of this function is done by iteratively maximizing with respect to the variational parameters and ($\mu, \Sigma$). Every computation is analytical in this case.

As used herein, the terms "optimization", "minimization", and the like are intended to encompass both absolute optimization or absolute minimization, and approximate optimization or approximate minimization. For example, in the Bayesian inference engine 10 of FIG. 2, the computing of the minimum of the upper bound may employ an iterative minimization algorithm whose iterations may be terminated based on a stopping criterion at some point before the absolute minimum is obtained. As used herein, this iterative minimization algorithm terminated prior to the absolute minimization computes a minimum of the upper bound, even though it may not be the absolute minimum. Similarly, the optimized transformation matrix 34 optimizes the softmax function respective to the constraints 20, 22, even though it may not be the absolute most optimum matrix for the softmax function respective to the constraints 20, 22. Indeed, since the upper bound is tight but not exactly equal to the softmax function (it is an upper bound and not, in general, an equality) the optimized transformation matrix 34 respective to the upper bound can be expected to be an approximate, but not exact, optimum for the bounded softmax function.

Phraseology such as "of the form" when used respective to mathematical expressions is intended to be broadly construed to encompass the base mathematical expression modified by substantially any substantively insubstantial modification. For example, the softmax function form of Equation (20) may be modified by the addition of scalar constants, scaling constants within the exponential, or so forth, and the softmax function so modified remains of the same form as that of Equation (20).

The illustrated embodiments relate to the softmax function. However, the disclosed techniques are more generally applicable to substantially any sum-of-exponentials function that includes at least one summation of exponentials. The optimization techniques disclosed herein entail constructing an upper bound using a double majorization bounding process to the softmax function or other sum-of-exponentials function including at least one summation of exponentials, and optimizing the constructed upper bound respective to parameters of the exponentials of the at least one summation of exponentials to generate optimized parameters.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A storage medium storing instructions executable to implement a sum-of-exponentials function optimization method including the operations of:

constructing an upper bound using a double majorization bounding process to a sum-of-exponentials function including at least one summation of exponentials;

optimizing the constructed upper bound respective to parameters of the exponentials of the at least one summation of exponentials to generate optimized parameters; and outputting the optimized sum-of-exponentials function represented at least by the optimized parameters.

2. The storage medium as set forth in claim 1, wherein the sum-of-exponentials function including at least one summation of exponentials comprises at least one softmax function of the form:

$$\frac{e^{\beta_k^T x}}{\sum_{k'=1}^{K} e^{\beta_{k'}^T x}}$$

and the optimizing comprises:

optimizing the constructed upper bound respective to parameters $\beta$ to generate optimized parameters $\beta$.

3. The storage medium as set forth in claim 2 where the optimized function contains a conditional probability model of outputs $y \in \{1, \ldots, K\}$ given inputs $x \in \Re^d$ under the form of a softmax function $$P(y=k \mid x; \beta) = \frac{e^{\beta_k^T x}}{\sum_{k'=1}^{K} e^{\beta_{k'}^T x}}.$$

4. The storage medium as set forth in claim 1, wherein the summation of exponentials is of the form $$\sum_{k=1}^{K} e^{\beta_k^T x}$$

and the operation of constructing an upper bound using a double majorization bounding process comprises first and second majorization processes comprising:
  upper bounding the summation of exponentials by a product of sigmoid functions; and
  employing a bound on $\log(1+e^x)$ in the upper bounding of the summation of exponentials of the form $$\sum_{k=1}^{K} e^{\beta_k^T x}.$$

5. The storage medium as set forth in claim 4, wherein the first majorization process generates an upper bound of the form:

$$\log \sum_{k=1}^{K} e^{x_k} \leq \alpha + \sum_{k=1}^{K} \log(1 + e^{x_k - \alpha})$$

where $\alpha \in \Re^K$.

6. The storage medium as set forth in claim 5, wherein the second majorization process modifies the upper bound of the form:

$$\log \sum_{k=1}^{K} e^{x_k} \leq \alpha + \sum_{k=1}^{K} \log(1 + e^{x_k - \alpha})$$

to the form:

$$\log \sum_{k=1}^{K} e^{x_k} \leq \alpha + \sum_{k=1}^{K} \frac{x_k - \alpha - \xi_k}{2} + \lambda(\xi_k)((x_k - \alpha)^2 - \xi_k^2) + \log(1 + e^{\xi_k})$$

for $\alpha \in \Re^K$ and $\xi \in [0, \infty)^K$ where:

$$\lambda(\xi) = \frac{1}{2\xi}\left[\frac{1}{1+e^{-\xi}} - \frac{1}{2}\right].$$

7. The storage medium as set forth in claim 1, wherein the summation of exponentials is of the form $$\sum_{k=1}^{K} e^{\beta_k^T x}$$

and the operation of constructing an upper bound using a double majorization bounding process comprises constructing an upper bound to an expectation of the sum-of-exponentials function under the form $$E_Q\left[\sum_{k=1}^{K} e^{\beta_k^T x}\right],$$

into an expectation having the form $E_Q[e^{\beta_k^T x}]$ where $Q(\beta_k)$ denotes a probability density function (pdf) over the parameters $\beta$ and $E_Q[\ldots]$ denotes an expectation with respect to Q.

8. The storage medium as set forth in claim 7, wherein a second majorization process of the double majorization bounding process produces an upper bound on expectation $\gamma$ of the form $$\gamma \leq \sum_{k=1}^{K} \lambda(\xi_k)\left(x^T \Sigma_k x + (\mu_x^T x)^2\right) + \left(\frac{1}{2} - 2\alpha\lambda(\xi_k)\right)\mu_k^T x +$$

$$\alpha - \sum_{k=1}^{K} \frac{\xi_k + \alpha}{2} + \lambda(\xi_k)(\alpha^2 - \xi_k^2) + \log(1 + e^{\xi_k})$$

for $\alpha \in \Re^K$ and $\xi \in [0, \infty)^K$ where:

$$\lambda(\xi_k) = \frac{1}{2\xi}\left[\frac{1}{1+e^{-\xi}} - \frac{1}{2}\right]$$

where $\mu_k$ is the expectation of $\beta_k$ and $\Sigma_k$ is the expectation of $(\beta_k - \mu_k)(\beta_k - \mu_k)^T$.

9. The storage medium as set forth in claim 1, wherein the storage medium stores further instructions executable to implement an inference method including the operations of:
  invoking the sum-of-exponentials function optimization method respective to a sum-of-exponentials function constrained by discrete observations y defining categorization observation conditioned by continuous variables x representing at least one input object where $y=(y_1, \ldots, y_n) \in \{1, \ldots, K\}^n$ and $x=(x_1, \ldots, x_n) \in \Re^{n \times d}$; and
  applying the optimized sum-of-exponentials function output by the invocation of the sum-of-exponentials function optimization method to the continuous variables x representing at least one input object to generate classification probabilities.

10. The storage medium as set forth in claim 9, wherein the continuous variables x represent at least one input text-based document in a bag-of-words representation.

11. The storage medium as set forth in claim 9, wherein the continuous variables x represent at least one input image in a features vector representation.

12. An inference engine comprising a processor programmed to perform an inference process comprising:
  generating an upper bound by double majorization for a sum-of-exponentials function including at least one summation of exponentials of the form $$\sum_{k=1}^{K} e^{\beta_k^T x}$$

constrained by an input object representation vector and an output classification observation vector;

optimizing the upper bound respective to parameters $\beta_k$ of the sum-of-exponentials function; and classifying one or more input objects by applying the sum-of-exponentials function with the optimized parameters $\beta_k$ to said one or more input objects.

13. The inference engine as set forth in claim 12, wherein the generating comprises:

a first majorization operation comprising upper bounding the summation of exponentials $$\sum_{k=1}^{K} e^{\beta_k^T x}$$

by a product of sigmoid functions; and a second majorization operation comprising bounding terms of the form $\log(1+e^x)$ generated by the first majorization operation.

14. The inference engine as set forth in claim 12, wherein the generating comprises generating an upper bound by double majorization for an expectation of the sum-of-exponentials function of the form $E_Q[e^{\beta_k^T x}]$ where x denotes the input object representation vector, $Q(\beta_k)$ denotes a probability density function (pdf) over the parameters $\beta_k$, and $E_Q[\ldots]$ denotes an expectation with respect to Q.

15. The inference engine as set forth in claim 12, wherein the sum-of-exponentials function is a softmax function.

16. The inference engine as set forth in claim 12, wherein the input object representation vector includes a bag-of-words representation of at least one text-based document and the classifying performs document classification.

17. The inference engine as set forth in claim 12, wherein the input object representation vector includes a features vector representation of at least one image and the classifying performs image classification.

18. A storage medium storing instructions defining a function for optimizing a sum-of-exponentials function including a summation of exponentials of the form $$\sum_{k=1}^{K} e^{\beta_k^T x}$$

by optimization operations comprising:

upper bounding the sum of exponentials $$\sum_{k=1}^{K} e^{\beta_k^T x}$$

by a product of sigmoids;

upper bounding terms of the form $\log(1+e^x)$ in the product of sigmoids to generate a double majorization upper bound;

minimizing the double majorization upper bound respective to the parameters $\beta$ to generate optimized parameters $\beta$; and outputting the optimized sum-of-exponentials function represented at least by the optimized parameters $\beta$.

19. The storage medium as set forth in claim 18, wherein the optimization function is configured to optimize a softmax function of the form $$\frac{e^{\beta_k^T x}}{\sum_{k'=1}^{K} e^{\beta_{k'}^T x}}.$$

20. The storage medium as set forth in claim 19, wherein the upper bounding of the sum of exponentials by the product of sigmoids generates an upper bound of the form:

$$\log \sum_{k=1}^{K} e^{x_k} \leq \alpha + \sum_{k=1}^{K} \log(1 + e^{x_k - \alpha})$$

where $\alpha \in \Re^K$; and the upper bounding terms of the form $\log(1+e^x)$ in the product of sigmoids generates the double majorization upper bound of the form:

$$\log \sum_{k=1}^{K} e^{x_k} \leq \alpha + \sum_{k=1}^{K} \frac{x_k - \alpha - \xi_k}{2} + \lambda(\xi_k)((x-\alpha)^2 - \xi_k^2) + \log(1 + e^{\xi_k})$$

for $\xi \in [0, \infty)^K$ where:

$$\lambda(\xi_k) = \frac{1}{2\xi} \left[ \frac{1}{1 + e^{-\xi}} - \frac{1}{2} \right].$$

21. The storage medium as set forth in claim 19, wherein the upper bounding a sum of exponentials by a product of sigmoids comprises upper bounding an expectation of the softmax function of the form $E_Q[e^{\beta_k^T x}]$ where $Q(\beta_k)$ denotes a probability density function (pdf) over the parameters $\beta$ and $E_Q[\ldots]$ denotes an expectation with respect to Q.

* * * * *